US005198098A

United States Patent [19]

Hettinger

[11] Patent Number: 5,198,098

[45] Date of Patent: * Mar. 30, 1993

[54] MAGNETIC SEPARATION OF OLD FROM NEW EQUILIBRIUM PARTICLES BY MEANS OF MANGANESE ADDITION

[75] Inventor: William P. Hettinger, Russell, Ky.

[73] Assignee: Ashland Oil, Inc., Ashland, Ky.

[ * ] Notice: The portion of the term of this patent subsequent to Apr. 21, 2009 has been disclaimed.

[21] Appl. No.: 602,455

[22] Filed: Oct. 19, 1990

[51] Int. Cl.[5] .................... C10G 59/04; B01J 37/34; B01J 20/34; B01J 38/72

[52] U.S. Cl. .................... 208/85; 208/52 CT; 208/253; 208/149; 208/152; 502/5; 502/21

[58] Field of Search .................... 208/52 CT, 253, 149, 208/85, 152; 502/5, 21

[56] References Cited

U.S. PATENT DOCUMENTS

| | | | |
|---|---|---|---|
| 2,065,460 | 12/1936 | Johnson | 209/214 |
| 2,956,004 | 10/1960 | Conn | 208/91 |
| 3,531,413 | 9/1970 | Rosensweig | 252/62.62 |
| 3,917,538 | 11/1975 | Rosensweig | 252/62.51 |
| 4,334,920 | 6/1982 | Mori | 75/26 |
| 4,360,441 | 11/1982 | Borrelli | 252/62.59 |
| 4,432,890 | 2/1984 | Beck | 502/62 |
| 4,523,047 | 6/1985 | Chester et al. | 208/950 |
| 4,695,392 | 9/1987 | Whitehead | 252/62.54 |
| 4,777,031 | 10/1988 | Senecal | 423/632 |
| 4,784,752 | 11/1988 | Ramamoorthy et al. | 208/52 CT |
| 4,810,401 | 3/1989 | Mair | 252/62.56 |
| 4,824,587 | 4/1989 | Kwon | 252/62.55 |
| 4,827,945 | 5/1989 | Groman | 128/653 |
| 4,835,128 | 5/1989 | Child et al. | 502/5 |
| 4,839,593 | 6/1989 | Spies | 324/240 |
| 4,878,132 | 10/1989 | Aratani | 360/59 |
| 4,923,688 | 5/1990 | Iannicelli | 423/224 |
| 4,956,075 | 9/1990 | Angevine | 208/120 |
| 5,106,486 | 4/1992 | Hettinger | 208/149 |

FOREIGN PATENT DOCUMENTS 0066018 12/1982 European Pat. Off. .

OTHER PUBLICATIONS

"Fluid Dynamics and Science of Magnetic Liquids", R. E. Rosensweig, Advances in Electronics and Electron Physics, vol. 48 (1979) pp. 103-199, Academic Press.

*Primary Examiner*—Theodore Morris
*Assistant Examiner*—P. L. Hailey
*Attorney, Agent, or Firm*—Richard C. Willison, Jr.

[57] ABSTRACT

An improved catalytic process for heavy hydrocarbon conversion, (usually, but not necessarily, in the presence of nickel and vanadium on the catalyst and in the feedstock.) to produce lighter molecular weight fractions. Manganese, which has paramagnetic properties, is added so it progressively accumulates on aged catalyst, and enhances magnetic separation of aged catalyst, to increase activity and improve selectivity of remaining catalyst which is recycled. Manganese acts as a "magnetic hook" to separate more magnetic, older, less catalytically active and less selective, higher-metals-containing catalyst particulates from less-magnetically-active, lower-metal-containing, more catalytically active and selective catalysts fractions, which are then recycled back to the unit.

30 Claims, 6 Drawing Sheets

MAGNETIC SEPARATION OF OLD FROM NEW EQUILIBRIUM PARTICLES BY MEANS OF MANGANESE ADDITION

BACKGROUND OF THE INVENTION

In conventional fluid bed cracking of hydrocarbon feedstocks, it is the practice, because of the rapid loss in catalyst activity and selectivity, to continuously add fresh catalyst regularly, usually daily, to an equilibrium mixture of catalyst particles. If metals, such as nickel and vanadium, are present in the feedstock, they accumulate almost completely on the catalyst, thus drastically reducing activity, producing more undesirable coke and hydrogen, and reducing selective conversion to gasoline. In such cases, catalyst replacement additions may have to rise significantly. Fluid cracking catalysts generally consist of small microspherical particles varying in size from 10 to 150 microns and represent a highly dispersed mixture of catalyst particles, some present in the unit for as little as one day, others there for as long as 60–90 days or more. Because these particles are so small, no process has been available to remove old catalysts from new. Therefore, it is customary to withdraw 1 to 10% or more of equilibrium catalyst containing all of these variously aged particles, just prior to addition of fresh catalyst particles, thus providing room for the incoming fresh "makeup" catalyst. Unfortunately, the 1 to 10% of equilibrium catalyst withdrawn itself contains, 1–10% of the very expensive catalyst added the day before, 1–10% of the catalyst added 2 days ago, 1–10% of the catalyst added 3 days ago, and so forth. Therefore, when removing equilibrium catalyst, unfortunately a large proportion of withdrawn catalyst still represents very active catalyst.

Catalyst consumption can be high. The cost associated therewith, especially when high nickel and vanadium are present in any amount greater than, for example, 0.1 ppm in the feedstock can, therefore, be great. Depending on the level of metal content in feed and desired catalyst activity, tons of catalyst must be added daily. For example, the cost of a catalyst at the point of introduction to the unit can be $2,000/ton or greater. As a result, a unit consuming 20 tons/day of "makeup" catalyst would require expenditures each day of $40,000. For a unit processing 40,000 barrels/day (B/D) this would represent a processing cost of $1/B or 2.5 cents/gallon, for catalyst use alone.

In addition to "makeup" catalyst costs, an aged high nickel and vanadium-ladened catalyst can also reduce yield of preferred liquid fuel products, such as gasoline and diesel fuel, and instead, produce more undesirable, less valuable products, such as dry gas and coke. Nickel and vanadium on catalyst also accelerate catalyst deactivation, thus further reducing operating profits.

Previous means to achieve effective magnetic separation of old catalyst from new is covered in U.S. Pat. No. 4,406,773 (1983) of W. P. Hettinger, et. al, and discloses use of a high magnetic field gradient separator (HGMS) produced by SALA. A carrousel magnetic separator containing a filamentary matrix within produces a high magnetic field gradient to achieve selective separation.

RELATED APPLICATIONS

Subsequent work has uncovered a preferred method of separation involving the use of a magnetic rare earth roller device (RERMS) and a pending application U.S. Ser. No. 07/332,079 filed Apr. 3, 1989, now U.S. Pat. No. 5,147,527, covers the concept of using such a device for magnetic separation.

In attempting to further improve separation, it has also been discovered that in the presence of larger amounts of paramagnetic iron, further improvement in separation selectivity can be realized and a pending application U.S. Ser. No. 07/479,003 filed Feb. 9, 1990 covers the concept of a "Magnetic Hook" TM, and the use of continuous addition of iron to enhance separation.

A more recent application, U.S. Ser. No. 601,965, filed Oct. 19, 1990, now abandoned, covers the discovery of a highly superparamagnetic specie, which when present in aged equilibrium catalyst, further improves separation due to its very high magnetic susceptibility compared to normal paramagnetic iron described in Ser. No. 07/479,003.

As a result, industry has long felt a need to selectively remove older catalyst from fresher catalyst in order to reduce catalyst addition rates while at the same time maintaining better activity, selectivity and unit performance. Because of the very small size of these particles, billions of particles are involved, and mechanical separation has been nearly impossible even if one could rapidly identify by some means, as for example, color, which particles are old, and which are new.

FIELD OF THE INVENTION

This invention introduces a new means of magnetically separating old catalyst from new by continuous addition of a low cost additive, namely manganese, which possesses good magnetic properties of its own. This additive particularly enhances the magnetic properties of those older catalyst particles which have, as they age, possibly already accumulated nickel and iron is gradually increasing amounts, although the invention can be utilized also in cases where no metal contaminants are encountered. By adding this inexpensive, nonharmful, enhancing additive, in large quantities as high as 50,000 ppm, magnetic separations of old catalyst from new can be greatly enhanced. In addition, it has also been discovered that by inclusion of this single unique additive to the catalyst, that catalyst activity and selectivity are also enhanced in a most striking fashion.

METHODS OF ADDITION

Manganese can be utilized as a "magnetic hook" additive in many different ways. It can be dissolved in water, as an inorganic compound, dispersed in the feedstock, as an emulsion, and added either continuously or periodically to the reactor as a part of the total feed. It can also be added as an inorganic salt dissolved in water, directly to the reactor, or to the regenerator, so as to deposit on the catalyst directly. It can also be added as an organic compound to the oil feedstock or added directly to the reactor by dissolving in a separate organic solvent or a small portion of the feedstock. Of particular interest, it can be added as manganese, monocyclopentadiene, tricarbonyl (MMT) in a very effective manner. The most important step in the process, however, is that it be introduced in such a manner as to deposit continuously and/or periodically on the entire equilibrium catalyst, so that buildup of the additive on any single particle is specifically tied to the time that any individual particle has been in the system. The amount of manganese to be added is determined continuously by observing the effectiveness of separation and by balancing additive costs versus benefits, and can be added continuously or periodically at any rate between 0.1 ppm and 100 ppm, so as to deposit on said total equilibrium catalyst in amounts from 100 to 50,000 ppm, with concentration in that portion of old catalyst ranging from 500 to 75,000 ppm in the 10% highest magnetic portion of equilibrium catalyst.

"MAGNETIC HOOKS TM"

Although iron has been shown to be a very effective "magnetic hook" additive, it does have some limitations which this invention addresses.

Other qualifications sought in a "magnetic hook" additive is that it will be inexpensive so that the cost of the additive does not offset the profit gains from magnetic separation, is readily available, and has no other adverse catalytic effects.

Transition metal elements, especially manganese, chromium, iron, nickel, and cobalt are all known for their relatively high magnetic susceptibilities, and except for the unfortunate tendency of nickel and cobalt; and iron at high levels, to make coke and hydrogen, all of these presumably might be considered good candidates for "magnetic hook" exploitation. But our studies have confirmed that this is not the case. Cobalt and nickel, and as mentioned, iron at high levels, surprisingly prove to be poor "magnetic hook" additives because of their tendency to make $H_2$ and coke.

But two other elements in this low cost category are chromium and manganese. This invention shows that of all of the high paramagnetic elements of this series, only manganese shows unusual, unpredictable, and unanticipated advantageous properties by all criteria.

DESCRIPTION OF THE PRIOR ART

Patents Related to Hydrocarbon Processing and Involving Magnetic Separation

A manual search in U.S. Patent Office, Class 55, subclass 3; Class 208, subclasses 52CT, 113, 119, 120, 121, 124, 137, 139, 140, 152, 251R, and 253; Class 209, subclasses 8, 38, 39, and 40; and Class 502, subclasses 5, 20, 21, 38, 515, 516, and 518 found principally the following references:

U.S. Pat. Nos. 4,359,379 and 4,482,450 to Ushio (assigned Nippon Oil Company), both disclose catalytic cracking and hydrotreating processes for carbo-metallic feedstocks which deposit nickel, vanadium, iron, and/or copper (originally contained in the heavy oil), on the catalyst, and then separating the old catalyst from the new by utilizing a high gradient magnetic separator (HGMS). However, the magnetizement is derived from the metals contained in the starting oil.

U.S. Pat. No. 2,348,418 (col. 2) to Roesch (Standard Oil, Indiana) regenerates catalyst by adding a magnetic substance, such as iron or nickel to the catalyst before the catalyst is introduced into a magnetic separator.

U.S. Pat. Nos. 4,292,171 and 4,294,688 both to Mayer (assigned Exxon) show catalytic reforming processes which utilize the addition of magnetizable particles to enhance catalyst separation via the use of magnetically stabilized fluidized beds.

U.S. Pat. No. 4,280,896 to Bearden passivates catalyst used to crack hydrocarbon feedstocks wherein nickel, vanadium and/or iron are deposited on the catalyst, but does not mention use of magnetic separation.

U.S. Pat. No. 4,541,920 to Seiver (Exxon) utilizes particles containing a non-ferromagnetic component and a catalytically active component composited with a ferromagnetic component so that the particles can be lined up in a magnetic field.

U.S. Pat. No. 4,835,128 to Child (Mobil) adds manganese when manufacturing "passavating" (getter) particles so they can be separated out when they are contaminated with vanadium.

Processes and Apparatus for Magnetic Separation

Magnetic methods for the treatment of material by J. Svoboda published by Elsevier Science Publishing Company, Inc., New York (ISBNO-44-42811-9) Volume 8) discloses both theoretical equations describing separation by means of magnetic forces and with the corresponding types of equipment that may be so employed. Specific reference is made to cross-belt magnetic separators and other belt magnetic separators involving a permanent magnet roll, as well as high gradient magnetic separators, each of which is efficient in separating magnetic particles.

U.S. Pat. No. 2,604,207 (1952) of W. J. Scott discloses an apparatus for separating magnetic from non-magnetic particles by means of permanent or electromagnetic magnets employed in connection with a moving belt. The belt moves through a quiescent liquid countercurrent to the direction of freely falling particulates. The magnetic particulates are attracted to the belt which is then scraped to remove magnetic particulates and which continues in an endless path through the quiescent liquid.

U.S. Pat. No. 3,463,310 (1969) of S. Ergun, et al. assigned to the United States of America discloses a process for separating a mixture finely divided particulate materials having particle size in the range 40 to 400 mesh. The process takes advantage of the conductivity differences to electromagnetic radiation between pyrite particles and thereby increasing, their magnetic properties. Claimed is the generalized means of separating materials susceptible to change in magnetic properties upon heating.

U.S. Pat. No. 3,901,795 (1975) of Smith, et al. assigned to Continental Can Company, Inc. discloses an apparatus for separating magnetic from non-magnetic materials wherein a first belt transfers a mixture of magnetic and non-magnetic materials into proximity of a magnetic transferring means which in effect transfers the magnetic material to a second belt. Permanent or electromagnetic fields are expressly disclosed. To provide more definitive separation, an air stream removes some of the non-magnetic materials from the second transfer belt that can be magnetic.

U.S. Pat. No. 1,390,688 (1921) of C. Ellis discloses a magnetic separation of catalytic material by means of an electromagnetic or permanent magnet, wherein finely divided nickel or magnetizable nickel oxide are removed from fatty acid oils prior to filtration of the fatty acid oils. The oil in suspended catalyst are allowed to flow past a plate under which electromagnets are placed causing the suspended catalyst to collect in a spongy mass around the magnetic poles and allowing the oil to pass off in the state of substantial clarity.

U.S. Pat. No. 2,348,418 (1944) of W. G. Roesch, et al. discloses a method to improve separation of hydrocarbon conversion catalyst from regeneration gases. Disclosed and claimed is the fact that fine sized particulates may be separated from flue gases by means of a magnetic field. After an initial separation of regeneration gases from regenerated catalyst, the regeneration gases are submitted to a reduction thereby reducing any magnetizable fine particulates to a magnetic field. There is no discussion of discriminating between different catalyst having different amount of metals.

U.S. Pat. No. 2,471,078 (1949) of H. J. Ogorzaly discloses separation of iron containing particulates from a catalyst having particle sizes in the range of 5 to 160 microns and higher used in a fluid catalytic cracking process. Catalyst quality is improved by magnetically separating iron contaminants prior to any significant introduction of the iron contaminants into the catalyst itself. The iron particulates tend to be small fines which would otherwise not be readily separated by a cyclone. Iron particulates are removed from reactant gases from the reaction zone and regeneration gases removed from the regeneration zone by subjecting such gases to a magnetic field under conditions to remove undesirable iron particulates. There is no teaching to show discrimination among the catalyst otherwise removed from the reaction that resolve from a cyclone separation. There is no teaching to suggest that iron or other contaminated particulates could or should be removed from that mixture of materials that result from separating in a cyclone or other separation means.

U.S. Pat. No. 2,631,124 (1953) of H. J. Ogorzaly discloses removal of undesirable iron particulates in a particle size range of 5 to about 160 microns and larger in a wet condition involving passing iron particulates contained in product gases from a tracking zone which have been subjected to a fractionation. The main difference between this process claimed in patent '124 from that disclosed in patent '078 is that the material is wet in '124 and dry in '078 and the material has undergone a fractionization in '124 to form a slurry prior to separation.

U.S. Pat. No. 2,723,997 (Nov. 15, 1955) entitled Separation of Catalyst from Liquid Products discloses separation of cobalt nickel or iron from liquid reaction products by means of a magnetic field employing, for example, permanent or electromagnets providing a series of fields of progressively increasing intensity through which the liquid passes. In one arrangement, the number of magnets increases progressively in the direction of flow of the liquid, which may be upward, downward or horizontal with respect to a vessel.

U.S. Pat. No. 2,635,749 (Apr. 21, 1953) discloses a method of separating active from inactive inorganic oxide catalyst that are in finely divided form. Catalyst are indicated to include those involved in cracking heavier oils such as gas oil into gasoline. Separation is effected by an electrostatic field wherein it was found that the less active catalyst passes through a cone or barrier onto succeeding electrodes without deflection. The more active catalysts tend to be deflected more extensively. Specifically, the electrostatic field is disclosed to be a pulsating electrostatics field with a strength of between 3,000 and 15,000 volts per centimeter.

U.S. Pat. No. 1,576,690 (Mar. 16, 1926) discloses a process for the magnetic separation of material on a plurality of separating rolls wherein separate strong and weak magnetic ores whether natural or treated are separated. The field strength of various points increases so that magnetic material of different strengths can be separated.

U.S. Pat. No. 2,459,343 (Jan. 18, 1949) discloses a means of removing ferrous and other particulate matter from liquids.

U.S. Pat. No. 4,772,381 (Sep. 20, 1988) discloses a method for separating a mixture of solid particulates that include non-magnetic electrically conductive metals into light and a heavy fraction. This is achieved by means of an alternating magnetic field in combination with an air flow which effects separation of light and heavy fractions of material. Specifically the electrically conducted particles are influenced by the alternating magnetic field and can be substantially accelerated in a desired manner.

U.S. Pat. No. 2,065,460 (Dec. 22, 1936) discloses use of a rotor to effect separation of weakly magnetic and non-magnetic materials by rotating the surface of the rotator through a maximum density of magnetic flux which is near the top of the rotor. Separation is affected because the more magnetically attractive material tends to stay on the rotor longer than material of a non-magnetic nature which tends to, as a result of momentum, go further outward and are separated into streams by means of blades defining different paths. The point at which non-magnetic particles project from the rotor are a function of speed of rotation of the rotor, friction between the particle and surface of the rotor, and the size and density of the particle.

U.S. Pat. No. 3,010,915 (Nov. 28, 1961) discloses a process involving nickel on kieselguhr catalyst for recycle of magnetically separated magnetic catalyst back to be used for further reactions. The catalyst size is from 1 to 8 microns. The specific nature of the magnetic separator is not considered the critical feature of the invention.

U.S. Pat. No. 4,021,367 to (1977) disclose a process for removing suspended metal catalyst from a liquid phase by continuously moving magnetic field of minimum intensity. Ferromagnetic materials are disclosed to be easily separated from a wide variety of solutions having a large range of viscosities. A continuously moving magnetic field has a minimum intensity of 200 oersteds produced by at least two disks rotating on a common shaft.

U.S. Pat. No. 4,029,495 (Jun. 14, 1977) discloses a process for recovering heavy metal catalyst components from a waste catalyst. The metal components consist of nickel, copper, molybdenum, vanadium or copper and the like which are induced to coalesces as a discreet mass separate and apart from other waste catalyst components. If flux is added during the process followed by heating and mixing and crushing to form particulates of waste catalyst and metallic components of the catalyst into separate distinct entities which are then separated by means of a high powered magnetic separator for rough separation followed by a more precise magnetic separation.

U.S. Pat. No. 3,725,241 (Apr. 3, 1973) discloses separation of hydrogenation of ash particles renders them susceptible to be removed by magnetic means. It was opined that the iron in the ash was converted by hydrogenation to a reduced form that in a magnetic field having a strength of greater than about 10 m Gauss. Process involved a coal liquefication improved by separating magnetically susceptible particles in a magnetic field of at least about 5 m Gauss. The ash particles add a particle size of less than roughly 200 mesh.

U.S. Pat. No. 4,388,179 (Jun. 14, 1983) discloses separation of mineral matter from carbonaceous fluids derived from oil shale. The process involves subjecting a heated oil shale mineral solid to a temperature at which magnetization of the material occurs. Continue heating above the temperature which magnetic transformation occurs continues to increases with increasing temperature to a maximum temperature at which peak magnetization occurs. Heating much above the point of peak magnetization results in a decrease in magnetization to a value of 0 around the Curie temperature. A variety of magnetic separation techniques are disclosed suitable to oil shale. Among these expressly center are super conducting magnetic separators, high-gradient magnetic separation ("HGMS") and the like.

U.S. Pat. No. 2,264,756 discloses a method for increasing settling of catalyst particulates used to hydrogenate resins and oils. Specific catalyst disclosed involve nickel. Subjecting the suspended particulates of a hydrogenated product to a magnetic field apparently causes a agglomeration or fluctuation of the particles so as to increase the rate of settling and therefore, the ease by which such particulates may be removed from a hydrogenation product.

U.S. Pat. No. 4,394,282 (Jul. 19, 1983) discloses a fluidized bed achieved by magnetization of particulates having certain sizes and being in part ferromagnetic.

U.S. Pat. No. 3,926,789 (Dec. 16, 1975) discloses magnetic separation of mixtures containing non-magnetic or paramagnetic materials by selectively changing the magnetic properties of certain of the materials. Specifically, magnetic fluids are caused to selectively wet and coat particles of one composition and add mixture with particles of a different composition. The difference in coating preference of the magnetic composition permits selectively separation of one material from those of another based upon differences tin surface properties there between.

U.S. Pat. No. 4,702,825 (Oct. 27, 1987) discloses a super conductor high gradient magnetic separator having unique design features that permit low cost operation and minimal heat loss.

Examples of patents disclosing metals and catalytic cracking particularly relevant to this invention are: U.S. Pat. Nos. 4,341,624; 4,347,122; 4,299,687; 4,354,923; 4,332,673; 4,444,651; 4,419,223; 4,602,993; 4,708,785; and 4,390,415.

None of the above patents disclose the manganese addition over time of the present invention.

SUMMARY OF THE INVENTION

This invention relates to the discovery that manganese, an element with good paramagnetic properties, can be used in place of iron as a "magnetic hook", enabling removal of old cracking catalyst from new by continuous addition. In addition, it is shown that manganese, unlike iron, also raises the cracking activity of catalyst and enhances cracking selectivity as well. It not only increases activity and gasoline yield, but surprisingly, lowers $H_2$ and coke make even below untreated catalyst, thus further increasing its unique value as a "magnetic hook".

PREFERRED EMBODIMENTS

EXAMPLE 1

Figure 1:
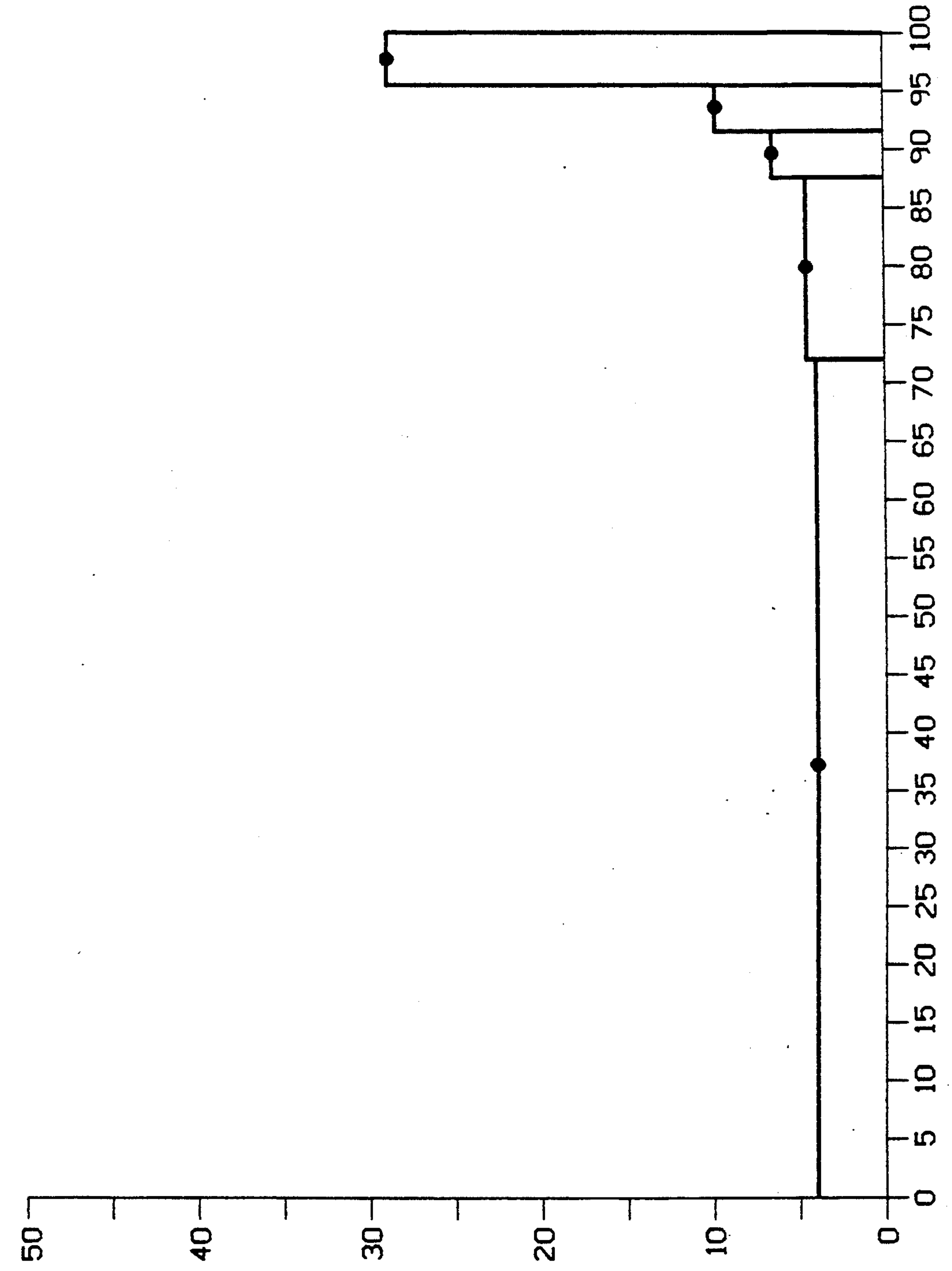
FIG. 1 is a plot of magnetic susceptibility (emu/gm) versus the percent magnetic for a series of fractions separated by separator 26 shown in FIG. 3.

Determination of Paramagnetic Properties of Transition Metal Laden Catalysts In seeking to determine whether any of the transition metals could have effective magnetic susceptibility values and acceptable catalytic properties, the following impregnation experiments were performed: 100 gms. of a typical commercial, cracking catalyst is slurried with 150 ml. of $H_2O$. A solution of a specific salt of each of the transition metals under consideration, namely chromium, manganese, iron, cobalt, and nickel, is prepared by dissolving a suitable amount of the salt in 50 ml. of water. Several levels of concentration of "magnetic hook" catalysts are prepared for iron, nickel, and chromium. Each solution is heated to boiling to assure complete solution and then rapidly mixed with the catalyst slurry to achieve adsorption of the metal on the catalyst surface. This mixture is allowed to remain in contact for 12 hours at room temperature, with intermittent shaking to insure good contact. After standing for 12 hours, each catalyst slurry is dewatered on a filter and the filter cake recovered. Each filter cake is oven dried, calcined at 1200° F. for four hours and allowed to cool. A sample is taken for metal analysis, and a second sample taken for measurement of magnetic susceptibility and catalyst activity and selectivity.

Compounds employed in this study are:

TABLE 1

Chromium III chloride tetrahydrate
Manganese II acetate tetrahydrate
Iron III sulfate pentahydrate
Iron oxalate
Cobalt acetate
Nickel chloride hexahydrate Each of these salts as purchased is evaluated for paramagnetic susceptibility (Xg) on a unmodified Johnson Mathey Magnetic Susceptibility Balance and had the values shown in Table 2.

TABLE 2

| | Salt Xg × $10^{-6}$ emu/gm. | As 100% Metal Xg × $10^{-6}$ emu/gm. |
|---|---|---|
| Chromium chloride | 27.5 | 141 |
| Manganese acetate | 57.9 | 245 |
| Iron sulfate | 51.9 | 224 |
| Iron oxalate | 78.8 | 253 |
| Cobalt acetate | 44.6 | 105 |
| Nickel chloride | 18.3 | 74 |

The chemical analyses for all of these impregnations are shown in Tables 3A and 3B, and the increase in metal content shown in Table 3A was used to determine the magnetic susceptibility contribution from all of these added elements. Table 3B results show that manganese is by far the most effective of the elements, being 20% more effective than cobalt, 70% more effective than iron, and significantly more effect than chromium. When deposited on the surface of a high surface area catalyst manganese is by far the most paramagnetic specie.

TABLE 3A

| MAGNETIC SUSCEPTIBILITY SENSITIVITY VALUES | |
|---|---|
| NOMINAL CONCENTRATION PPM TRANSITION METALS | TOTAL − VIRGIN CAT = INCREASE PPM By Analysis |
| 10,000 Iron | 12,440 − 3,500 = 8,940 |
| 25,000 Iron | 28,387 − 3,500 = 24,887 |
| 10,000 Iron | 14,418 − 3,500 = 10,918 |
| 10,000 Nickel | 4,593 − 24 = 4,569 |
| 25,000 Nickel | 7,401 − 24 = 7,377 |
| 10,000 Cobalt | 4,600 − <100 = 4,600 |
| 10,000 Manganese | 6,000 − <100 = 6,000 |
| 10,000 Chromium | 10,100 − 70 = 10,030 |
| 25,000 Chromium | 18,200 − 70 = 18,130 |
| Commercial Low Rare Earth Catalyst Support | |

TABLE 3B

| MAGNETIC SUSCEPTIBILITY SENSITIVITY VALUES | | | | | | |
|---|---|---|---|---|---|---|
| | TOTAL − VIRGIN CAT = ELEMENT $Xg \times 10^{-6}$ emu/gm | | | $Xg \times 10^{-6}$ emu/gm MAGNETIC SUSCEPT. OF GIVEN ELEMENT PRESENT | | |
| TRANSITION METALS | | | 1% | 100% | Ave. 100% | |
| Iron | 2.35 | 0.78 | 1.57 | $1.64 \times 10^{-6}$ | 164 | 185 |
| Iron | 5.66 | 0.78 | 4.88 | 1.76 | 176 | |
| Iron | 3.13 | 0.78 | 2.35 | 2.15 | 215 | |
| Nickel | 1.52 | 0.78 | 0.74 | 1.62 | 162 | 148 |
| Nickel | 1.78 | 0.78 | 1.00 | 1.35 | 135 | |
| Cobalt | 2.00 | 0.78 | 1.22 | 2.65 | 265 | |
| Manganese | 2.67 | 0.78 | 1.89 | 3.15 | 315 | |
| Chromium | 1.08 | 0.78 | 0.30 | 0.29 | 29 | |
| Chromium | 1.63 | 0.78 | 0.85 | 0.40 | 40 | |
| Commercial Low Rare Earth Catalyst support | | — | 0.78 | — | — | |

EXAMPLE 2

Catalytic Properties of "Magnetic Hook" Promoted Catalysts

Although manganese is now discovered to be the most magnetically effective of the transition metal elements for deposit on particles, and certainly a readily available and low cost candidate as a "magnetic hook", a study is made to determine the relative catalytic behavior effect of these paramagnetic element impregnated catalysts. In order to be a suitable candidate, the additive has to meet the requirements of low cost, ready availability, high paramagnetic properties, and have no adverse effect on catalyst performance, and to be at least as effective as iron.

To determine the impact of these additives on catalytic behavior, each of the catalyst samples in Example 1 is submitted for catalytic cracking microactivity testing (ASTM MAT Test). Each of these samples is calcined for four hours at 1200° F. prior to testing. In addition, in order to more closely simulate operating conditions, each sample is steamed at 1425° F. for 24 hours prior to testing. The results of testing these samples are shown in Tables 4A and 4B.

TABLE 4A

| Ashland Magnetic Hook Study | | | |
|---|---|---|---|
| Metal Addition | None | Chromium | Manganese |
| Conversion, Wt. % | 67.37 | 66.26 | 74.64 |
| Conversion, Vol. % | 69.09 | 67.87 | 76.60 |
| Product Yields, Wt. % on Fresh Feed | | | |
| C2 and Lighter | 1.41 | 1.17 | 1.51 |
| Hydrogen | 0.11 | 0.10 | .09 |
| Methane | 0.45 | 0.36 | .47 |
| Ethane | 0.37 | 0.32 | .41 |
| Ethylene | 0.48 | 0.39 | .54 |
| Carbon | 3.64 | 3.67 | 3.82 |
| Product Yields, Wt. % (Vol. %) on Fresh Feed | | | |
| Total C3 Hydrocarbon | 5.36 | 5.01 | 4.99 |
| Propane | .62 | .53 | .83 |
| Propylene | 4.75 | 4.47 | 4.16 |
| Total C4 Hydrocarbon | 10.54 | 10.26 | 10.17 |
| I-Butane | 3.55 | 3.40 | 4.48 |
| N-Butane | .54 | .48 | .82 |
| Total Butenes | 6.45 | 6.38 | 4.88 |
| Butenes | 3.18 | 3.14 | 2.05 |
| T-Butene-2 | 1.86 | 1.85 | 1.62 |
| C-Butene-2 | 1.40 | 1.38 | 1.21 |
| C5-430F Gasoline | 46.42 | 46.16 | 54.15 |
| 430–650F LCGO | 22.35 | 23.18 | 18.25 |
| 650F+ Decanted Oil | 10.28 | 10.56 | 7.11 |
| C3+ Liquid Recovery | 94.95 | 95.16 | 94.67 |
| ISO/(C3 + C4) Olefin Ratio | .32 | .32 | .50 |
| Coke Sélectivity | 1.64 | 1.74 | 1.22 |
| Weight Balance | 99.71 | 100.17 | 98.52 |
| Steaming Temperature, F. | 1425 | 1425 | 1425 |
| Steaming Time, Hours | 24 | 24 | 24 |
| Feedstock | RPS | RPS | RPS |
| Cat/Oil Ratio | 4.60 | 4.51 | 4.58 |
| Reaction Temperature, F. | 960.00 | 960.00 | 960.00 |
| Reaction Time, Seconds | 25.00 | 25.00 | 25.00 |
| WHSV | 31.30 | 31.90 | 31.50 |

TABLE 4B

| Ashland Magnetic Hook Study | | | | |
|---|---|---|---|---|
| Metal Addition | Low Iron | High Iron | Nickel | Cobalt |
| Conversion, Wt. % | 69.69 | 55.29 | 63.48 | 70.96 |
| Conversion, Vol. % | 71.53 | 57.48 | 65.06 | 72.82 |
| Product Yields, Wt. % on Fresh Feed | | | | |
| C2 and Lighter | 1.34 | 1.42 | 1.82 | 1.32 |
| Hydrogen | 0.13 | 0.39 | .57 | 0.12 |
| Methane | 0.41 | 0.41 | .44 | 0.40 |
| Ethane | 0.35 | 0.31 | .34 | 0.36 |
| Ethylene | 0.45 | 0.32 | .46 | 0.45 |
| Carbon | 4.27 | 5.59 | 5.37 | 3.75 |
| Product yields, Wt. % (Vol. %) on Fresh Feed | | | | |
| Total C3 Hydrocarbon | 5.12 | 3.38 | 4.18 | 4.63 |
| Propane | .58 | .32 | .43 | .57 |
| Propylene | 4.54 | 3.07 | 3.76 | 4.05 |
| Total C4 Hydrocarbon | 10.65 | 6.81 | 8.48 | 9.94 |
| I-Butane | 3.58 | 1.31 | 2.30 | 3.64 |
| N-Butane | .54 | .24 | .36 | .55 |
| Total Butenes | 6.54 | 5.26 | 5.82 | 5.75 |
| Butenes | 3.18 | 2.88 | 3.01 | 2.66 |
| T-Butene-2 | 1.92 | 1.35 | 1.61 | 1.77 |
| C-Butene-2 | 1.44 | 1.03 | 1.21 | 1.32 |
| C5-430F Gasoline | 48.30 | 38.09 | 43.63 | 51.32 |
| 430–650F LCGO | 21.20 | 27.70 | 24.60 | 20.87 |
| 650F+ Decanted Oil | 9.11 | 17.01 | 11.92 | 8.17 |
| C3+ Liquid Recovery | 94.38 | 92.99 | 92.81 | 94.93 |
| ISO/(C3 + C4) | .33 | .16 | .24 | .38 |

TABLE 4B-continued

| Ashland Magnetic Hook Study | | | | |
|---|---|---|---|---|
| Metal Addition | Low Iron | High Iron | Nickel | Cobalt |
| Olefin Ratio | | | | |
| Coke Selectivity | 1.72 | 4.25 | 2.90 | 1.42 |
| Weight Balance | 99.09 | 99.87 | 98.72 | 98.48 |
| Steaming Temperature, F. | 1425 | 1425 | 1425 | 25 |
| Steaming Time, Hours | 24 | 24 | 24 | 24 |
| Feedstock | RPS | RPS | RPS | RPS |
| Cat/Oil Ratio | 4.54 | 4.63 | 4.52 | 4.55 |
| Reaction Temperature, F. | 960.00 | 960.00 | 960.00 | 960.00 |
| Reaction Time, Seconds | 25.00 | 25.00 | 25.00 | 25.00 |
| WHSV | 31.70 | 31.10 | 31.80 | 31.70 |

Because transition metal catalysts are notorious for their dehydrogenation activity, a comparison of the molar hydrogen-to-methane ratio was calculated and is shown in Table 5.

TABLE 5

| Catalyst Sample | Molar Hydrogen-to-Methane Ratio |
|---|---|
| Base Low Rare Earth | 1.96 |
| Base + Chromium | 2.22 |
| Base + Manganese | 1.53 |
| Base + Low Iron | 2.54 |
| Base + High Iron | 7.61 |
| Base + Nickel | 10.36 |
| Base + Cobalt | 2.40 |

The two samples containing iron, especially iron at high level (25,000 ppm), exhibit some level of dehydrogenation activity, as does the sample containing nickel. These results would typically be expected. In addition, it shows that the cobalt also has a slight activity for dehydrogenation. The chromium does not appear to have had any major effect on $H_2$, coke, or catalyst activity.

Some very interesting results are obtained with the manganese-containing sample. The conversion level on this sample exceeded the base catalyst by over 7.0 vol. %. A second MAT run was completed with the manganese as a check on the initial results and the activity and yields were duplicated.

Although one is highly impressed with the level of activity increase reported for the manganese sample, the effect on selectivity is even more striking. Even though the activity increased 7 vol. %, rather than decreased, the molar hydrogen-to methane ratio dropped by 22%, the absolute hydrogen yield is the lowest, the coke yield at a much higher conversion level is almost equal to the coke yield generated for the base run, and gasoline production is strikingly high.

These results demonstrate that in addition to its exceptional magnetic behavior and its use as a "magnetic hook", contrary to all expectations and experience, manganese also demonstrates an ability to enhance activity, provide more resistance to deactivation than the base catalyst, and demonstrates a completely unanticipated outstanding ability to increase conversion and gasoline yield while at the same time reducing coke make and $H_2$.

Although iron at lower levels (up to 15,000 ppm) behaves very well, at much higher levels of 2.5 wt. % it too begins to show $H_2$ and coke-making tendencies. Therefore, manganese also has the additional attractive feature of being able to replace or supplant iron when greater magnetic susceptibility "magnetic hook" properties are required.

EXAMPLE 3

Figure 2:
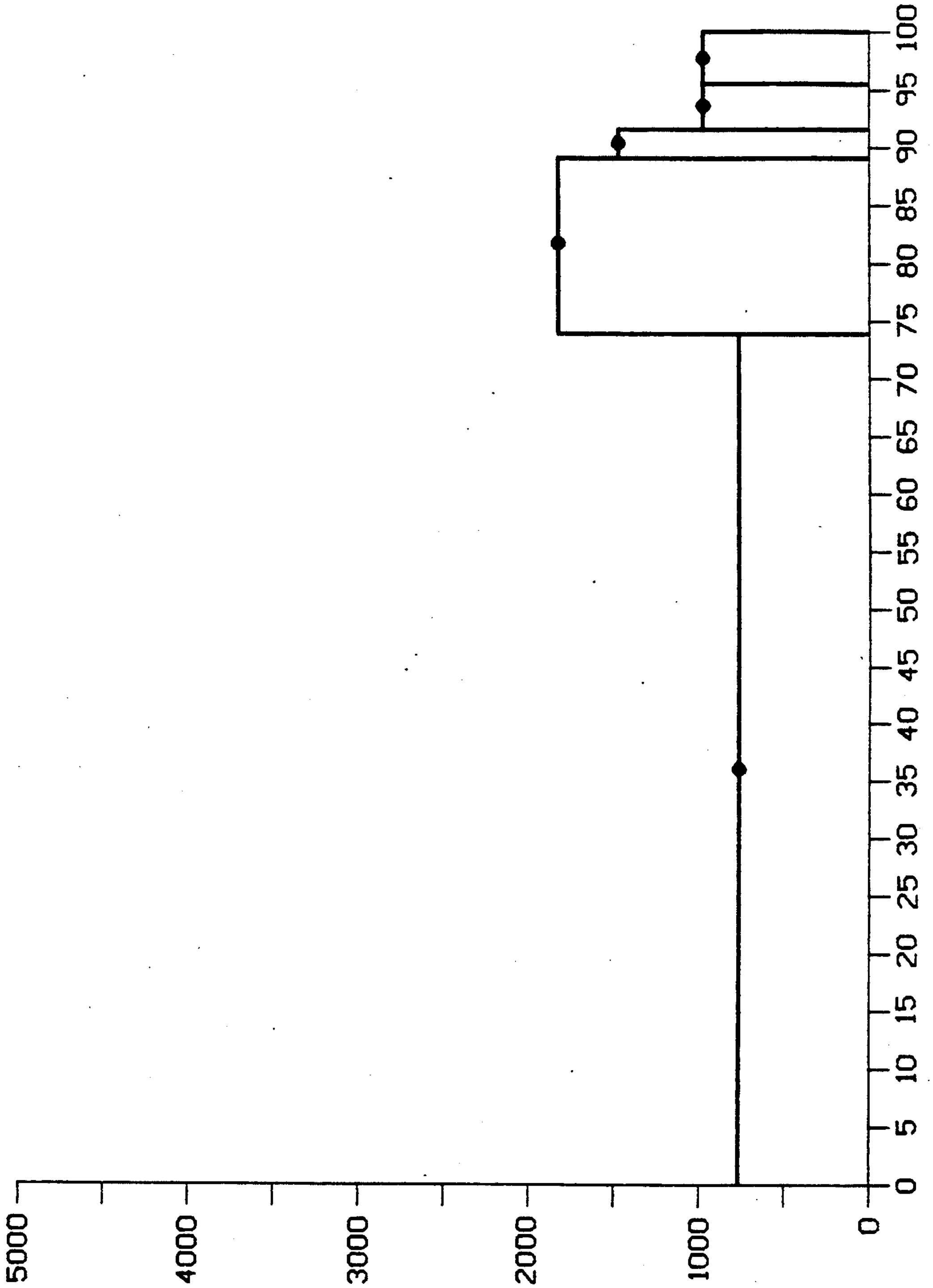
FIG. 2 is a plot of manganese content (ppm) versus percent magnetic for a series of fractions.

Use of Manganese as a Fluid Cracking Catalyst "Magnetic Hook" Treatment in Inert Gas, Simulating Reactor Conditions To demonstrate the ability of manganese to perform as a "magnetic hook", the following experiment is performed: 20 gms. of manganese impregnated catalyst containing 6,000 ppm of manganese shown in Table 3 is mixed intimately with 80 gms. of virgin catalyst. The mixture was calcined at 1200° F. in nitrogen, cooled, and subjected to magnetic separation on a rare earth roller magnetic separator (RERMS), manufactured by Ore Sorters, Corp. The sample is split into five fractions of increasing magnetic strength. Table 6 shows the wt. % of the various cuts, the manganese chemical analysis, and the magnetic properties of each fraction. FIG. 1 shows magnetic susceptibility plotted versus percent magnetic, and FIG. 2 shows the manganese chemical analysis versus magnetic percent. As can be seen, manganese is very effective in providing a "magnetic hook" by which to achieve separation, and therefore, when utilized as an additive in continuous addition, can also be used to establish the catalyst age of individual particles in the unit. But more importantly, it is very effective in separating old catalyst from new.

TABLE 6

(See FIGS. 1 & 2)
MANGANESE ADDITION
20% catalyst plus 6,000 ppm manganese
80% catalyst - no manganese
Composition of blended catalyst 1200 ppm manganese

| Cut # | Wt. % Mag. Fract. | Iron ppm | Manganese ppm | Magnetic Suscept. Xg × $10^{-6}$ emu/gm |
|---|---|---|---|---|
| 1. | 4.8 | 3,914 | 930 | 27.9 |
| 2. | 3.3 | 3,565 | 930 | 9.9 |
| 3. | 4.0 | 3,285 | 1,470 | 6.3 |
| 4. | 14.4 | 3,355 | 1,780 | 4.9 |
| 5. | 73.5 | 3,285 | 774 | 3.5 |
| 100% Feed | | | 1,200 | |

It should also be noted in Table 6 and FIG. 2 that part of the magnetic susceptibility increase is undoubtedly due to a trace amount of superparamagnetic material in a very small portion of the most magnetic material between 96 and 100% of percent magnetic in spite of the smaller amount of less active iron present in all of the samples. The data shows and demonstrates how manganese can also amplify and enhance magnetic separation as a "magnetic hook", and can even augment, supplant, and further enhance magnetic separation in those cases where iron is added as a "magnetic hook". Here manganese can be added as an additional and complimentary additive. This invention, therefore, also includes adding a combination of iron and manganese additives, as well as manganese, individually.

EXAMPLE 4

Figure 3:
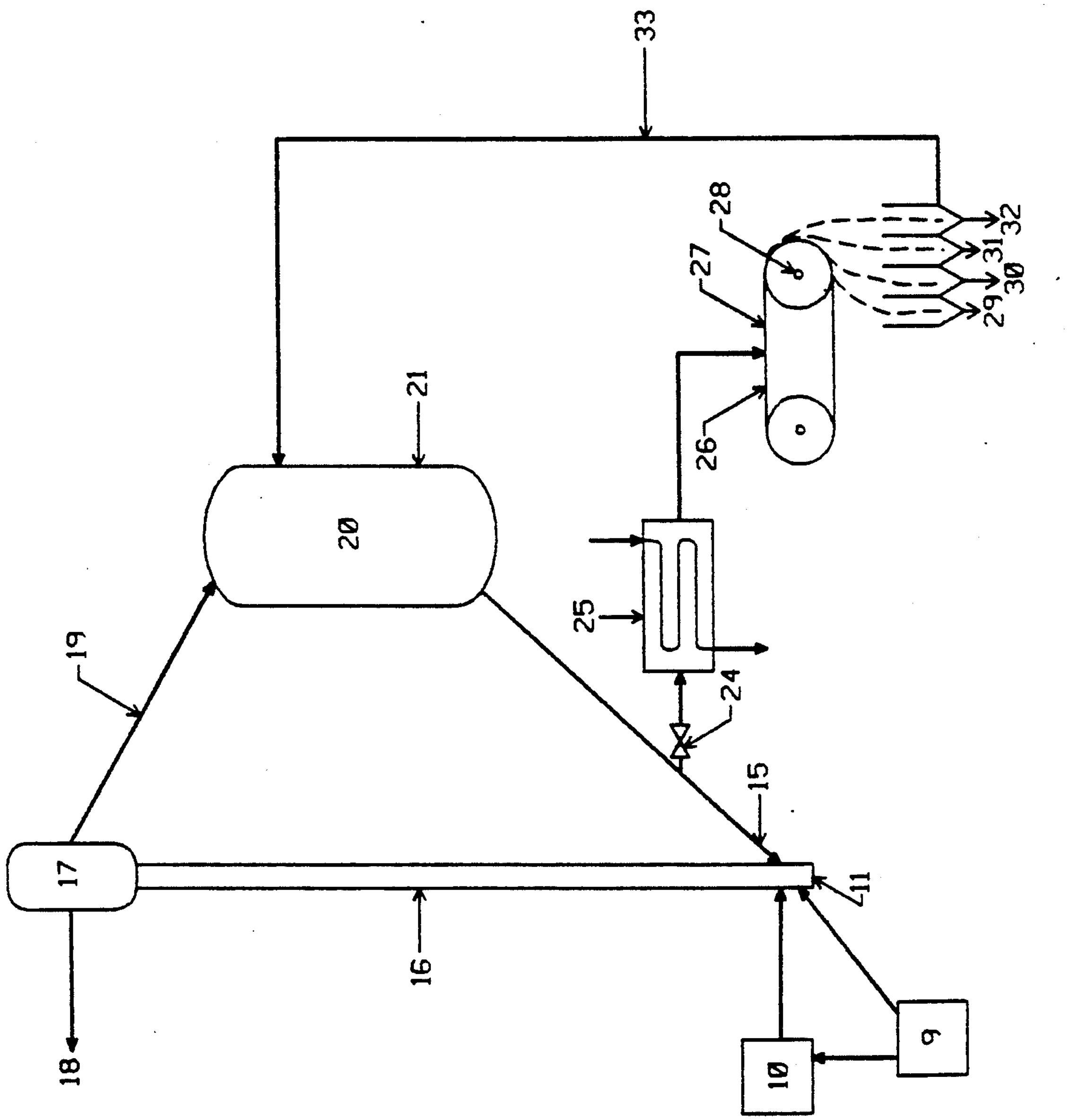
FIG. 3 is a schematic diagram of the apparatus for hydrocarbon conversion and magnetic separation of catalysts as described in Example 4.

(See FIG. 3)

Operating Process Example

FIG. 3 shows one example of how the process employing this technology is utilized. Bottoms derived from distilling off a portion of crude oil 10 enters the riser reactor at 11. In the riser the reduced crude contacts regenerated catalyst returning from the regenerator line 15 and travels up the riser 16 cracking the reduced crude and generating product 18 and spent catalyst 17 which is contaminated with coke and metals from the reduced crude. The spent catalyst 17 enters the regenerator 20 via line 19 and is oxidized with air 21 to burn off coke and thereby regenerate the catalyst for return to the riser 16. About 8% of the regenerated catalyst is diverted through line 24 to catalyst cooler 25 and to feed to magnetic separator 26, where it falls onto belt 27, moves past roller 28, a high intensity rare earth-containing permanent magnetic roller which splits the catalyst into two or more portions 29 to 32. The more magnetic (more metal-contaminated) and more "magnetic hook" promoted portions, e.g. 29, and/or 29 and 30 are rejected for chemical reclaiming, metals recovery, or disposal. The less magnetic (less metal-contaminated) portions 31 and/or 31 and 32 travel through line 33 back to the regenerator 20. The manganese additive 9 is either added in amounts of 0.1 to 100 ppm to the feedstock in an organic solvent or water at 10 or on the catalyst at the bottom of the riser 11 prior to catalyst contact with oil.

EXAMPLE 5

Use of Manganese as a Fluid Cracking Catalyst "Magnetic Hook" Simulating Regenerator Conditions This example of how a manganese "magnetic hook" functions is similar to example 3, but differs in that the catalyst, 20 wt. % of which contained 5,500 ppm of manganese mixture, is calcined in air to simulate regenerator conditions. In example 3, the catalyst mixture of 20 wt. % manganese-promoted catalyst combined with 80 wt. % impregnated catalyst to simulate and demonstrate how magnetic separation can be achieved, was calcined in $N_2$. Because of the presence of a small amount of carbon in this catalyst, calcination in $N_2$ tends to create a reducing atmosphere which increases the magnetic contribution of natural iron existing in virgin catalyst, and hence, magnetic susceptibility.

Figure 4:
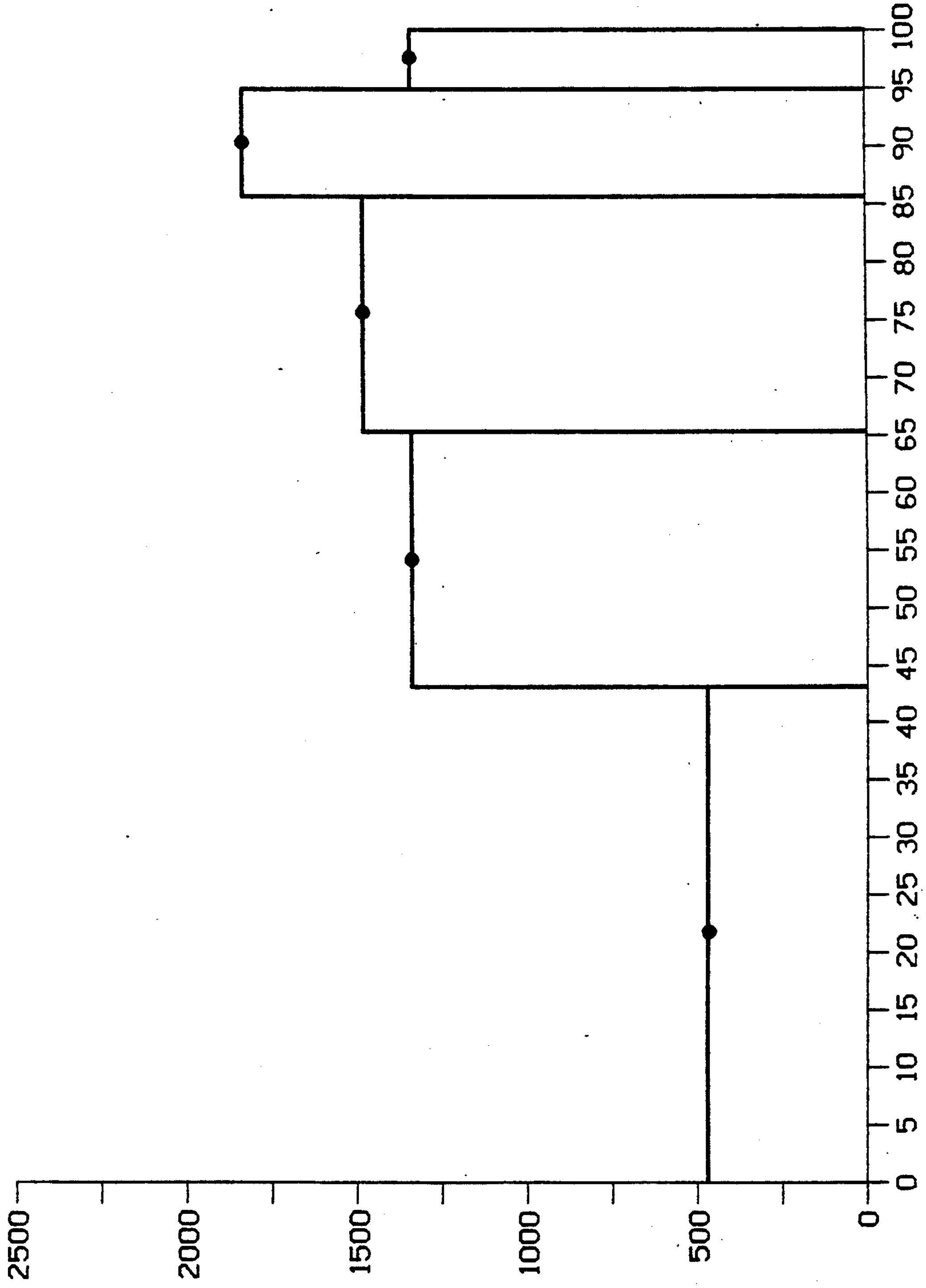
FIG. 4 is a plot of manganese content (ppm) versus percent magnetic for a series of fractions of catalysts also separated as described above for FIG. 3, as were all the magnetic fractions described in the figures.
Figure 5:
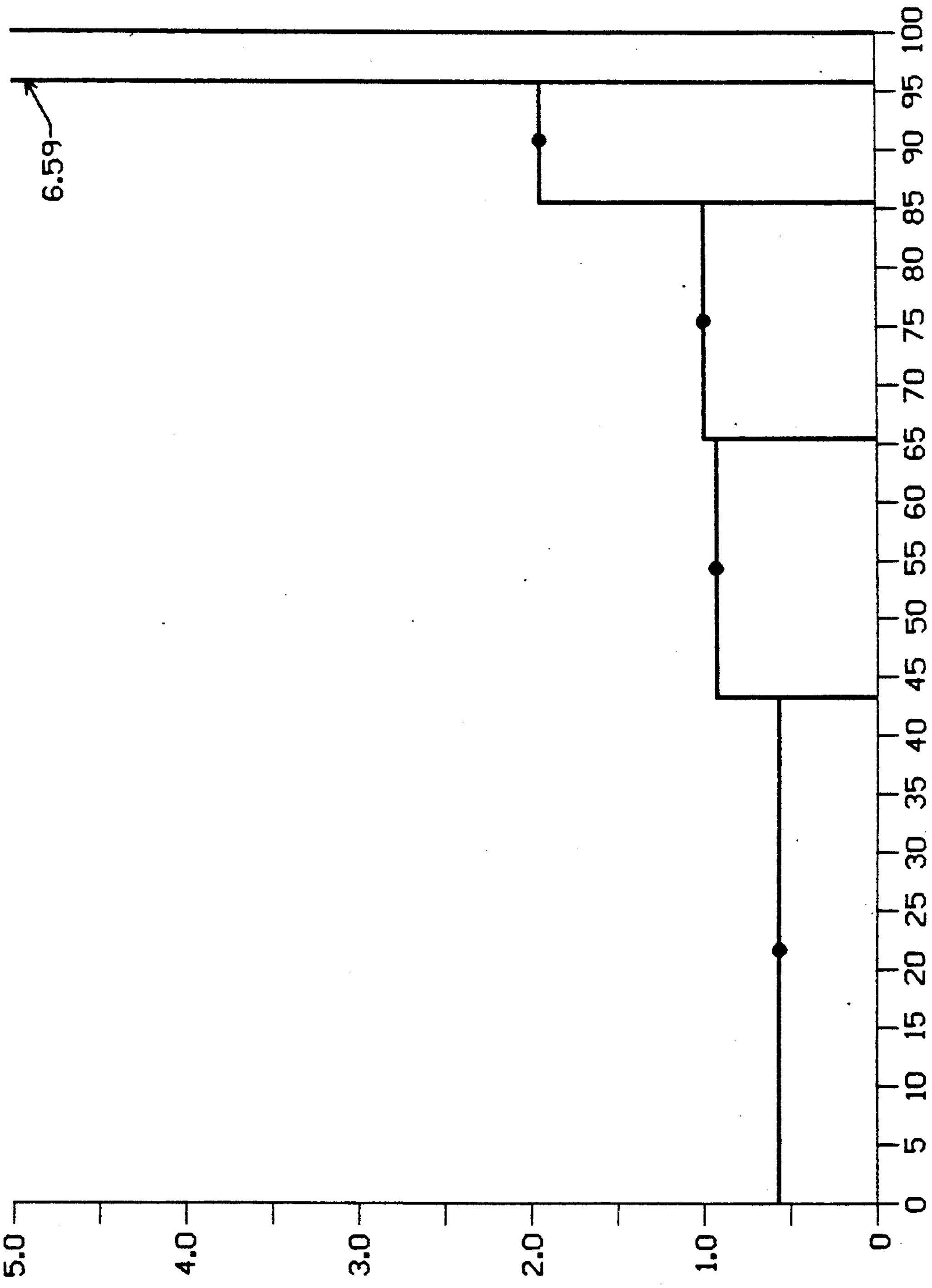
FIG. 5 is a plot of magnetic susceptibility versus percent magnetic for a series of fractions similarly magnetically separated.

This mixture is also subjected to magnetic separation on a rare earth roller magnetic separator (RERMS) and is also split into five fractions. However, in this case, large size cuts were made so that a clearer distinction could be made as to the effectiveness of the manganese "magnetic hook". Table 7 shows the wt. % of the various cuts, with cut #1 being the most magnetic and cut #5 the least magnetic. Also shown is the manganese chemical analysis and magnetic susceptibilities of these fractions. This data is plotted in FIGS. 4 and 5 respectively, and again demonstrates the effectiveness of the manganese in facilitating separation. In actual practice, because of the continuing addition of "magnetic hook" manganese to the circulating catalyst, a concentration gradient of manganese would also result, and concentrations of manganese in the oldest portion could rise to as high as 50,000 ppm or higher depending on the level of addition. Because the additive laydown rate is determined by the outside exposed surface of each sphere, smaller particles would accumulate manganese somewhat more rapidly than larger particles. But because contaminated metal, especially nickel, is also laid down by the same mechanism, the effect of the additive would thereby also relate to metal content, and hence, the degree of effectiveness.

TABLE 7

(See FIG. 4)
MANGANESE ADDITION
20% catalyst plus 5,500 ppm manganese
80% catalyst - no manganese

| Cut # | Wt. % Mag. Fract. | Manganese ppm | Iron ppm | Magnetic Suscept. Xg × $10^{-6}$ emu/gm |
|---|---|---|---|---|
| 1. | 4.5 | 1,316 | 3,910 | 6.59 |
| 2. | 9.0 | 1,780 | 3,490 | 1.88 |
| 3. | 20.9 | 1,470 | 3,560 | 0.98 |
| 4. | 22.2 | 1,393 | 3,490 | 0.85 |
| 5. | 43.4 | 493 | 3,490 | 0.61 |

Note that there was a slight gradient effect on iron as well.

Figure 6:
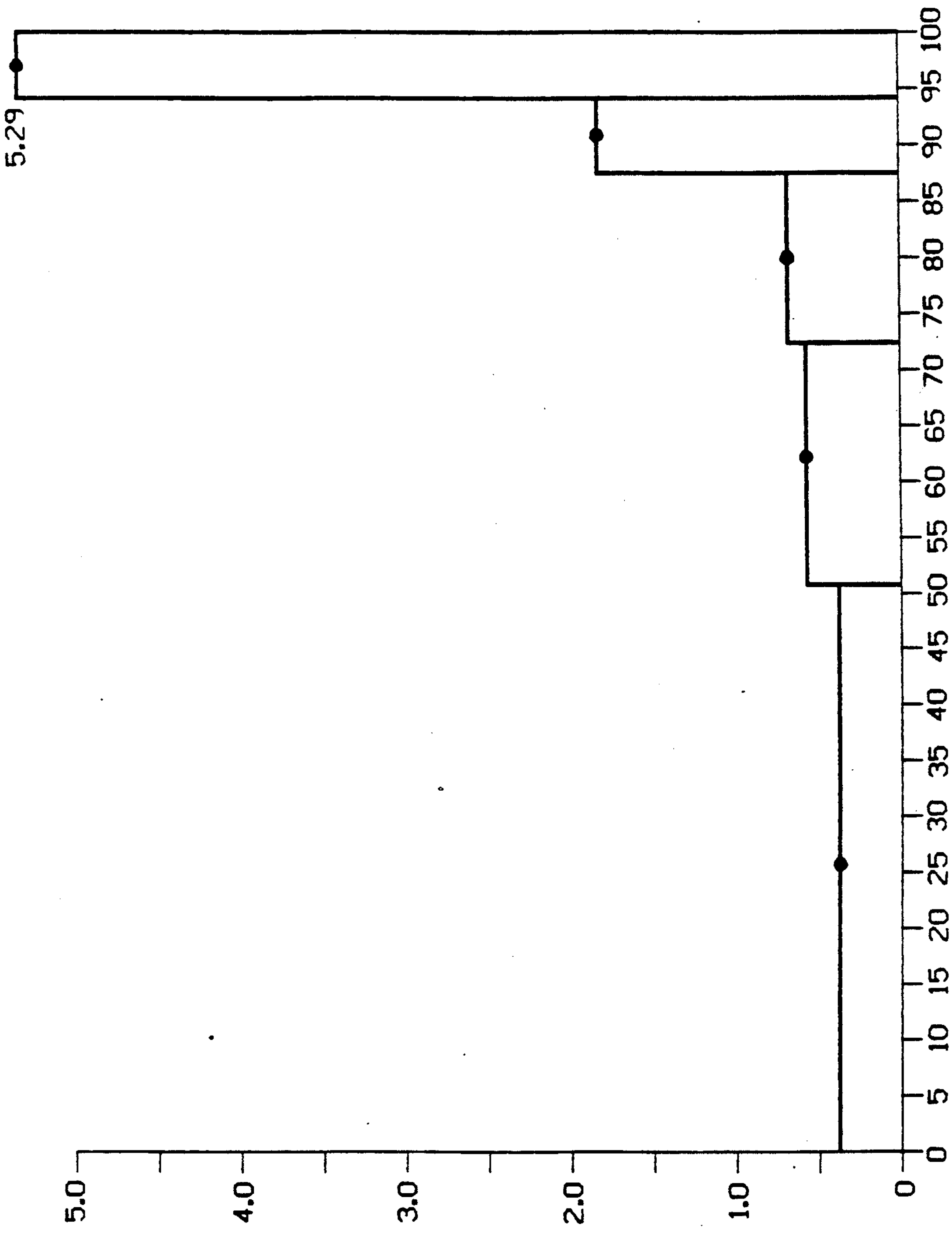
FIG. 6 is a plot of magnetic susceptibility versus percent magnetic for a series of fractions similarly separated for one run with no manganese and a second run with manganese added.

In order to compare these values with untreated catalyst, a similar run was made on the base material. No excellent beneficiation shown in FIG. 4. Table 8 shows a similar breakdown without manganese addition. FIG. 6 compares to Tables 7 and 8.

TABLE 8

NO MANGANESE ADDITION
100% catalyst

| Cut # | Wt. % Mag. Fract. | Manganese ppm | Iron ppm | Magnetic Suscept. Xg × $10^{-6}$ emu/gm |
|---|---|---|---|---|
| 1. | 6.1 | none | 3.640 | 5.29 |
| 2. | 6.5 | none | 3,490 | 1.79 |
| 3. | 14.5 | none | 3.420 | 0.68 |
| 4. | 22.1 | none | 3.280 | 0.62 |
| 5. | 50.8 | none | 3,550 | 0.41 |

Note that a magnetic gradient does exist in the untreated catalyst, but in all cases, it is lower than the treated sample and differs by 0.20 $Xg \times 10^{-6}$ emu/gm to 1.3 $Xg \times 10^{-6}$ emu/gm, much in keeping with manganese content. It should be noted that calcining in air tended to reduce the total magnetic susceptibility of all samples by 5 to 10 fold, again also demonstrating the effect of treatment on magnetic susceptibility, although the order of samples remains fairly consistent, and in both examples confirm the benefit of the presence of a magnetic age amplifying additive. FIG. 6 is a plot of magnetic susceptibility for the untreated sample and compared to the treated sample. The effect of manganese in terms of higher magnetic susceptibility is again clearly shown.

MODIFICATIONS

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein.

Reference to documents made in the specification is intended to result in such patents or literature being expressly incorporated herein by reference including any patents or other literature references cited within such documents.

What is claimed is:

1. A hydrocarbon feedstock conversion process which utilizes magnetic separation for removal of cracking catalyst and/or sorbent particles in a circulating particle conversion system, said process comprising:

a. adding over time a magnetic manganese-containing compound to the circulating particles whereby manganese accumulates on individual particles in amounts proportional to the time that the respective particle has been circulating in the system;

b. separating particles containing magnetically active manganese by magnetic means; and c. recycling at least a portion of particles comprising manganese concentrations lower than those of said separated particles and having higher activity than said separated particles, back to said conversion system.

2. A process as claimed in claim 1 wherein the hydrocarbon feedstock comprises more than 0.1 ppm nickel and 0.1 ppm vanadium in the feedstock, said processing comprising:

a. continuously or periodically adding a magnetically active manganese containing compound to the circulating particles so as to accumulate manganese on individual catalyst particles as a function of the time that the particle has been in the unit at a rate of about 0.1 to 5 times the concentration of nickel plus vanadium;

b. separating older particles containing higher concentrations of paramagnetic manganese and thereby higher magnetic properties by magnetic means; and c. returning lower manganese concentration catalyst particles of higher activity back to the system.

3. A process as claimed in claims 1 or 2 whereby manganese is added continuously or periodically to the feedstock, so as to deposit on the catalyst in amounts in the range of about 100 to 30,000 ppm.

4. A process as claimed in claim 2 whereby manganese is added continuously or periodically to the feedstock so as to deposit on the catalyst in amounts in the range of about 0.1 to 10 times the nickel equivalent.

5. A process as claimed in claims 1 or 2 whereby manganese is added continuously or periodically to the catalyst by means of water or organic solvent, so as to deposit on the catalyst in amounts in the range of about 100 to 30,000 ppm.

6. A process as claimed in claims 1 or 2 wherein said manganese additive is added as an inorganic compound.

7. A process as claimed in claims 1 or 2 wherein said manganese additive is added as an organic compound.

8. A process as claimed in claims 1 or 2 wherein said manganese additive is added as a water soluble compound.

9. A process as claimed in claims 1 or 2 wherein said manganese additive is added as an oil soluble compound.

10. A process as claimed in claims 1 or 2 wherein said manganese additive is added in an organic solvent to the hydrocarbon feedstock.

11. A process as claimed in claims 1 or 2 wherein said manganese additive is added as manganese monocyclopentadienyl tricarbonyl (MMT).

12. A process as claimed in claim 2 wherein catalyst particles containing higher amounts of magnetically active manganese also contain higher levels of nickel equivalents and are separated by magnetic separation from catalyst particles containing lower amounts of magnetically active ions or elements and also lower nickel equivalents.

13. A process as claimed in claims 1, 2 or 12 wherein the magnetic separation is achieved by means of a high gradient electromagnetic separation device of about 1,000 to 20,000 Gauss field strength.

14. A process as claimed in claims 1, 2 or 12 wherein magnetic separation is achieved by means comprising a rare earth-containing magnetic roller.

15. A process as claimed in claims 1, 2 or 12 wherein magnetic separation is achieved by means comprising a ferrite roller magnetic separator.

16. A process as claimed in claims 1, 2 or 12 wherein magnetic separation is achieved by means comprising a superconducting magnetic separator.

17. A process as claimed in claim 16 wherein said superconducting magnetic separator operates in the range of about 10,000 to 50,000 Gauss field strength.

18. A process as previously claimed in claims 1, 2 or 12 wherein the feedstock has a Conradson Carbon number greater than 1.

19. A process as previously claimed in claims 1, 2 or 12 wherein said feedstock has an API gravity between 10 and 30.

20. A process as previously claimed in claims 1, 2 or 12 wherein said feedstock comprises reduced crude.

21. A process as previously claimed in claims 1, 2 or 12 wherein said system comprises a fluid catalytic cracker.

22. A process as claimed in claims 1, 2 or 12 wherein the equilibrium catalyst has a nickel equivalent, excluding iron, of 1,000 ppm or greater.

23. A process as claimed in claims 1, 2 or 12 wherein the equilibrium catalyst has a nickel equivalent, excluding iron, of 500 ppm or greater.

24. A process as claimed in claims 1, 2 or 12 wherein manganese is added as a sulfate, chloride, acetate, carbonate, nitrate or perchlorate.

25. A process as claimed in claims 1, 2 or 12 wherein manganese is added as a carbonyl or acetylacetonate.

26. A process as claimed in claims 1, 2 or 12 wherein manganese is added as collodial manganese oxide or dioxide.

27. A process as claimed in claims 1, 2 or 12 wherein manganese is added as a permanganate of ammonia.

28. A process as claimed in claims 1, 2 or 12 wherein manganese is added at a rate such as to produce a circulating catalyst with an overall concentration of manganese greater than 500 ppm.

29. A process as claimed in claims 1, 2 or 12 wherein manganese is added at the rate of 0.1 to 100 ppm of oil.

30. A process as claimed in claims 1, 2 or 12 wherein a combination of iron and manganese salts or organic compounds at 0.2 to 5 parts of manganese to one part iron, are added continuously and/or periodically to provide a magnetic hook enhancing separation of old catalyst from new.

* * * * *

UNITED STATES PATENT AND TRADEMARK OFFICE
CERTIFICATE OF CORRECTION

PATENT NO. : 5,198,098

DATED : March 30, 1993

INVENTOR(S) : William P. Hettinger, Jr.

It is certified that error appears in the above-identified patent and that said Letters Patent is hereby corrected as shown below:

Column 4, lines 3-4, delete "manganese" and substitute in place thereof --iron--.

Signed and Sealed this

Third Day of May, 1994

Attest:

BRUCE LEHMAN

Attesting Officer

Commissioner of Patents and Trademarks